(12) United States Patent
Fujiwara et al.

(10) Patent No.: US 8,944,745 B2
(45) Date of Patent: Feb. 3, 2015

(54) CARRIER DEVICE, TRANSFER METHOD AND CARRIER HAND

(75) Inventors: Katsumi Fujiwara, Tochigi (JP); Shunsuke Sunahara, Tochigi (JP); Takeshi Tada, Tochigi (JP); Takayuki Motojima, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 677 days.

(21) Appl. No.: 13/284,285

(22) Filed: Oct. 28, 2011

(65) Prior Publication Data

US 2012/0114455 A1 May 10, 2012

(30) Foreign Application Priority Data

Nov. 5, 2010 (JP) ................................. 2010-248653
Nov. 5, 2010 (JP) ................................. 2010-248654

(51) Int. Cl.
*B65G 1/133* (2006.01)
*B23P 19/00* (2006.01)
*B23P 19/04* (2006.01)

(52) U.S. Cl.
CPC ............. *B23P 19/001* (2013.01); *B23P 19/045* (2013.01)
USPC ...... 414/751.1; 414/749.5; 294/65; 294/87.1; 294/87.26

(58) Field of Classification Search
CPC .............................. B23P 19/001; B23P 19/045
USPC ........ 414/416.02, 749.5, 751.1; 294/65, 87.1, 294/87.26
See application file for complete search history.

(56) References Cited

U.S. PATENT DOCUMENTS

| 4,892,183 | A | * | 1/1990 | Fenton ........................ 198/468.3 |
| 5,471,738 | A | | 12/1995 | Burcham et al. |
| 5,539,981 | A | | 7/1996 | Burcham et al. |
| 6,439,631 | B1 | * | 8/2002 | Kress ............................... 294/65 |

FOREIGN PATENT DOCUMENTS

| JP | S61-201791 U | 12/1986 |
| JP | S64-16234 U | 1/1989 |
| JP | H3-87592 U | 9/1991 |
| JP | 04-119526 | 4/1992 |

(Continued)

OTHER PUBLICATIONS

Japanese Office Action issued to JP Application No. 2010-248654 mailed Sep. 10, 2013, 2 pages.

(Continued)

*Primary Examiner* — Scott Lowe
(74) *Attorney, Agent, or Firm* — Rankin, Hill & Clark LLP

(57) ABSTRACT

A carrier device is provided that can supply, at uneven intervals, a plurality of works arranged at even intervals. The carrier device (1) includes: a first retaining portion (11), second retaining portion (12), third retaining portion (13) and fourth retaining portion (14) that hold and carry a plurality of works arranged at even intervals and supply these to a supply pallet (7) at any intervals; and a retaining base portion (20) to which these first to fourth retaining portions are connected. The retaining base portion (20) includes first to fourth sliding portions that cause the first retaining portion (11) to fourth retaining portion (14) to approach each other or separate in the arrangement direction of the works. The first retaining portion (11) to fourth retaining portion (14) respectively include first engaging parts and second engaging parts that disengage with the works independently.

2 Claims, 10 Drawing Sheets

(56) References Cited

FOREIGN PATENT DOCUMENTS

| | | |
|---|---|---|
| JP | 05-309585 | 11/1993 |
| JP | 05-318372 | 12/1993 |
| JP | H07-164263 | 6/1995 |
| JP | 2001-198871 | 7/2001 |
| JP | 2005-067752 | 3/2005 |
| JP | 2006-026869 | 2/2006 |
| JP | 2006-198717 | 8/2006 |
| JP | 2008-532786 | 8/2008 |
| WO | 2006/098556 | 9/2006 |

OTHER PUBLICATIONS

Japanese Office Action issued to JP Application No. 2010-248653 mailed Sep. 10, 2013, 2 pages.

* cited by examiner

FIG. 7A
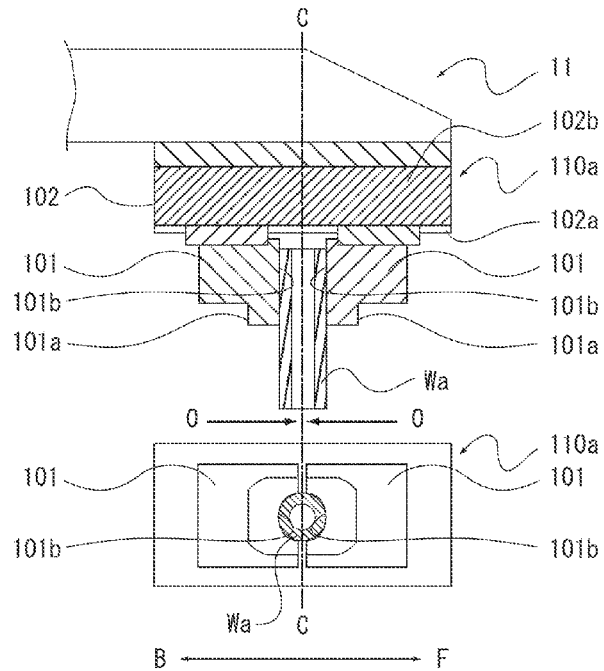
FIG. 7B
FIG. 8A
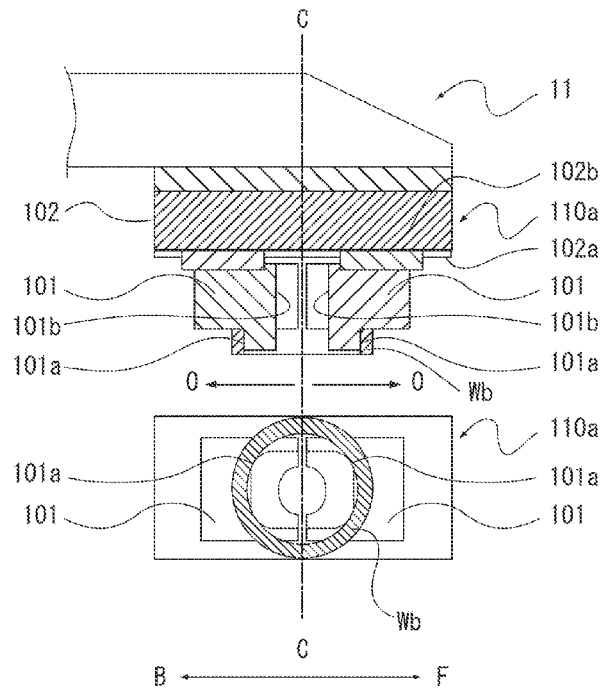
FIG. 8B

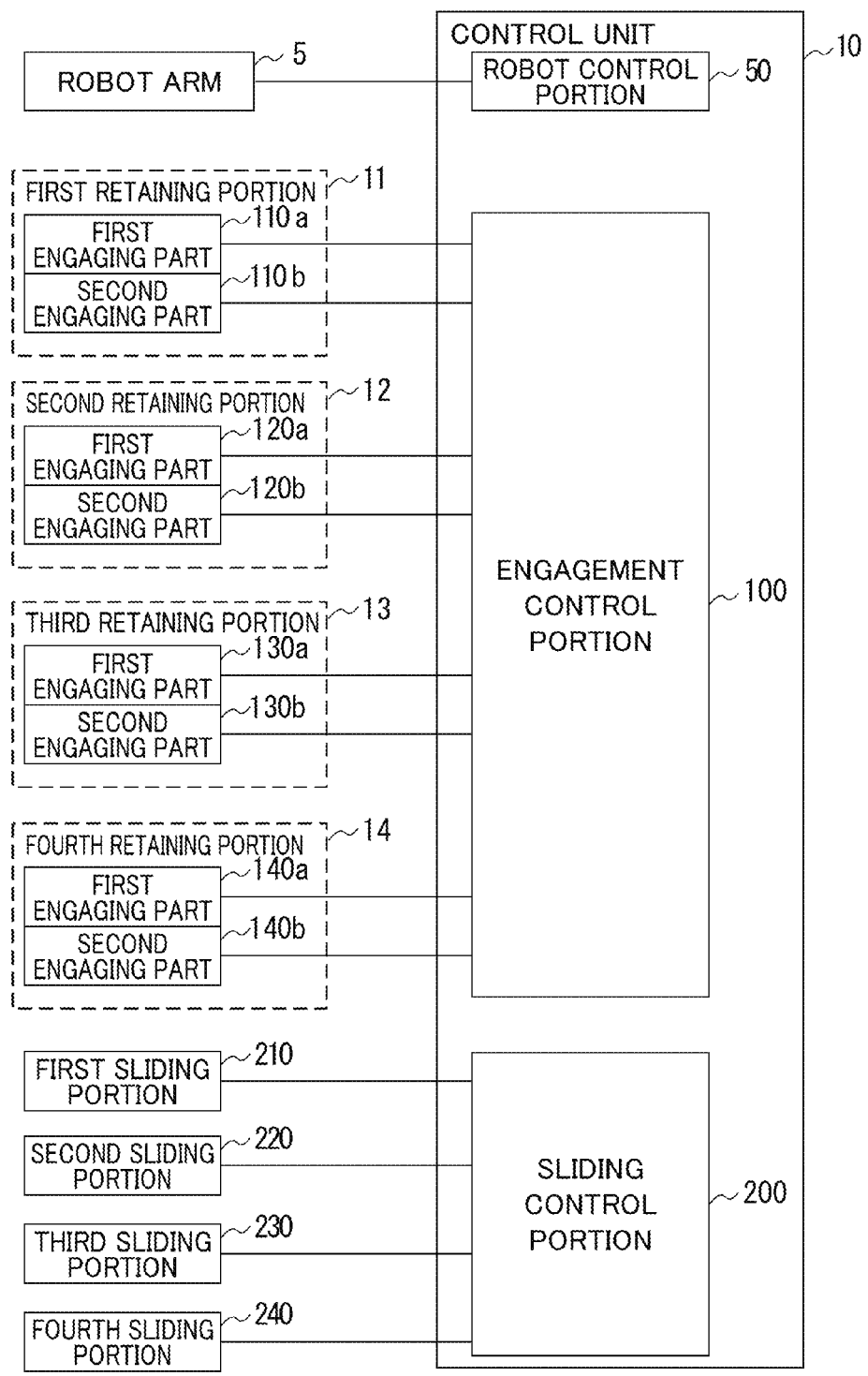

CARRIER DEVICE, TRANSFER METHOD AND CARRIER HAND

This application is based on and claims the benefit of priority from Japanese Patent Application Nos. 2010-248653 and 2010-248654, respectively filed on 5 Nov. 2010 and 5 Nov. 2010, the contents of which are incorporated herein by reference.

BACKGROUND OF THE INVENTION

1. Field of the Invention

The present invention relates to a carrier device and a transport method. More specifically, the present invention relates to a carrier device that holds and carries a plurality of works arranged at even intervals, and supplies these to a supply portion at arbitrary intervals, and a transfer method. In addition, the present invention relates to a carrier hand. More specifically, the present invention also relates to a carrier hand that holds and carries a plurality of works.

2. Related Art

Conventionally, in a manufacturing process, a plurality of works is temporarily stored in a cutting pallet for aligning these works at even intervals. A carrier device holds and carries the plurality of works arranged at even intervals in the cutting pallet, and supplies these works to a predetermined supply part.

Herein, when the plurality of works is arranged in the cutting pallet according to the type of work, the intervals have come to differ. Therefore, it has been necessary for the carrier device to change the positions of the retaining portions holding the plurality of works to the intervals of the works arranged in the cutting pallet.

Patent Document 1 discloses an article feeding device that retains a plurality of articles disposed at even intervals by way of a retaining portion that includes a plurality of drive wheels each having different diameters and fixed to each other coaxially, a plurality of timing belts bridging between the respective drive pulleys, a plurality of article retaining parts that is mounted to the respective timing belts and retain articles, and a rotational drive means for rotationally driving the plurality of drive wheels.

According to this article feeding device, the plurality of drive wheels integrally rotate by way of the rotational drive means, and each of the article retaining parts moves only by an amount according to the rotation angle of the drive wheel, and thus each of the article retaining parts has an even interval, and can be varied to any interval depending on the rotation angle of the drive wheels.

In addition, conventionally, in a manufacturing process, the works are temporarily stored in a cutting pallet in order to arrange these works at fixed intervals. The carrier device holds and carries the plurality of works arranged at fixed intervals in the cutting pallet, and supplies these works to a predetermined supply part.

However, since the works differ in shape and size according to the type of works, the carrier device must hold and carry works by carrier hands suited to the shape and size of each work. If providing a carrier hand for every type of work, however, the installation space of the carrier device will increase.

Patent Document 1 shows an article feeding device that retains the articles by air suction using a suction means provided at a central portion of the article retaining part, and then feeds the articles.

According to this article feeding device, it is possible to retain and supply articles even if the shapes and sizes differ according to the type of article since the articles are air suctioned by the suction means; therefore, it is not necessary to provide a carrier device for every type of article, and thus the carrier device can be simplified.

Patent Document 1: Japanese Unexamined Patent Application, Publication No. 2005-67752

SUMMARY OF THE INVENTION

However, in manufacturing processes, the plurality of works is arranged at even intervals in a cutting pallet may be supplied to a supply part at uneven intervals. For example, in the manufacturing process of engines, valve guides and valve seats, which are the works, are arranged at even intervals in a cutting pallet and supplied by the carrier device to locations enabling to be press fit in the intake ports and the exhaust ports of the cylinder head; however, although the intake ports and exhaust ports in the cylinder head are each arranged on a substantially straight line, the intervals thereof are uneven.

In addition, among all the types of works, there are works for which a central portion thereof is hollow. For example, among works in the manufacturing process of engines, valve guides and valve seats have central portions that are hollow. For a work having such a central portion that is hollow, the article feeding device of Patent Document 1 cannot retain the central portion of work at the central part of the article retaining part. If the central portion of the work cannot be retained by the central part of the article retaining part, the balance will be poor, and the work may fall when holding and carrying the work, the position at which it is held may shift, and thus works may not be able to be reliably carried.

The present invention has an object of providing a carrier device that can supply, at uneven intervals, a plurality of works arranged at even intervals.

In addition, the present invention has an object of providing a carrier hand that can reliably carry even works having a central portion that is hollow, and enables simplification of the equipment.

According to a first aspect of the present invention, a carrier device (e.g., the carrier device 1 described later) that holds and transfers a plurality of works (e.g., the works W described later) arranged at even intervals to be supplied to a supply portion (e.g., the supply pallet 7 described later) at arbitrary intervals, includes: a plurality of retaining portions (e.g., the first retaining portion 11, second retaining portion 12, third retaining portion 13 and fourth retaining portion 14 described later) that hold the work; and a retaining base portion (e.g., the retaining base portion 20 described later) to which the plurality of retaining portions is connected, in which the retaining base portion includes a plurality of sliding portions (e.g., the first sliding portions 210, second sliding portions 220, third sliding portions 230 and fourth sliding portions 240) that allow the plurality of retaining portions to approach each other or separate from each other in an arrangement direction of the works, and the plurality of retaining portions each include at least two engaging parts (e.g., the first engaging part 110a and second engaging part 110b, first engaging part 120a and second engaging part 120b, first engaging part 130a and second engaging part 130b, and first engaging part 140a and second engaging part 140b described later) that disengage with the works independently.

According to the first aspect of the invention, the carrier device that holds and carries a plurality of works arranged at even intervals to supply them to a supply portion at any interval provides, to the retaining base portion to which the plurality of retaining portions holding the works is connected, a plurality of sliding portions that cause the plurality of retaining portions to approach each other or separate in the arrangement direction of the works, and provides to each of the plurality of retaining portions at least two engaging parts that independently disengage with the works, respectively.

The carrier device holds the plurality of works arranged at even intervals by the at least two engaging parts of the plurality of retaining portions, and can thereby supply the works to the supply portion after causing the plurality of retaining portions holding the works to respectively approach and separate from each other via the plurality of sliding portions, so that the intervals of the plurality of works held becomes the intervals of works to be supplied to the supply portion. In other words, the plurality of works held by the plurality of retaining portions are divided into at least two groups, and a plurality of works can be supplied in groups to the supply portion at any intervals.

Therefore, it is possible to provide a carrier device that can supply, at uneven intervals, a plurality of works arranged at even intervals.

According to a second aspect of the present invention, a transfer method for supplying a plurality of works arranged at even intervals to a supply portion (e.g., the supply pallet 7 described later) at arbitrary intervals includes the steps of: holding each of the plurality of works by at least two engaging parts provided to each of a plurality of retaining portions; transferring the plurality of works to the supply portion; setting first works (e.g., the work Wa described later) that are one type among the plurality of works held in the at least two retaining parts, respectively, at a predetermined interval, by driving a plurality of sliding portions to cause the plurality of retaining portions to approach each other or separate from each other in an arrangement direction of the plurality of works; supplying the first works to the supply portion; setting second works (e.g., the work Wb described later) that are another type among the plurality of works held in the at least two engaging parts, respectively, at a predetermined interval, by driving the sliding portions to cause the plurality of retaining portions to approach each other or separate from each other; and supplying the second works to the supply portion.

According to the second aspect of the invention, a transfer method for supplying a plurality of the works arranged at even intervals to a supply portion at arbitrary intervals includes: a step of holding a plurality of the works with at least two engaging parts provided to the plurality of retaining portions, respectively; a step of transferring the plurality of works to the supply portion; a step of setting the first works, which are one portion among the plurality of works held in the at least two engaging parts, respectively, to predetermined intervals by driving the plurality of sliding portions to cause the plurality of retaining portions to approach or separate from each other in the arrangement direction of the plurality of works; a step of supplying the first works to the supply portion; a step of setting second works, which are another portion of the plurality of works W held in the at least two engaging parts, respectively, to predetermined intervals by driving the sliding portions to cause the plurality of retaining portions to approach or separate from each other in the arrangement direction of the plurality of works; and a step of supplying the second works to the supply portion.

After causing the plurality of retaining portions to approach or separate from each order in order to set the first works, among the plurality of works held in the at least two engaging parts, respectively, to predetermined intervals, they can be supplied to the supply portion. After causing the plurality of retaining portions to approach or separate from each order in order to set the second works, among the plurality of works held in the at least two engaging parts, respectively, to predetermined intervals, they can be supplied to the supply portion. In other words, the plurality of works held by the plurality of retaining portions are divided into at least two groups, and a plurality of works can be supplied in groups to the supply portion at any intervals.

Therefore, it is possible to provide a transfer method that can supply, at uneven intervals, a plurality of works arranged at even intervals.

According to a third aspect of the present invention, a carrier hand (e.g., the first retaining portion 11, second retaining portion 12, third retaining portion 13 and fourth retaining portion 14 described later) that holds and carries a plurality of works, includes: a pair of retaining means (e.g., the retaining means 101 described later) having an outer wall (e.g., the outer wall 101a described later) of substantially semicircular shape and an inner wall (e.g., the inner wall 101b described later) of substantially semicircular shape; and a pressing means (e.g., the pressing means 102 described later) for causing the pair of retaining means to approach each other or separate from each other, in which the pair of retaining means holds the work with the inner wall by being brought close to each other by way of the pressing means, and holds the work with the outer wall by being separated from each other by way of the pressing means, the pair of retaining means being provided in plurality to be connected along an arrangement direction of the plurality of works.

According to the third aspect of the invention, the carrier hand that holds and carries a plurality of works, includes the pair of retaining means having the outer wall of substantially semicircular shape and the inner wall of substantially semicircular shape, and the pressing means that causes this pair of retaining means to approach each other or separate. These pairs of retaining means hold a work with the inner walls by being brought close to each other by way of the pressing means, or hold a work with the outer walls by being separated from each other by way of the pressing means, and these pairs of retaining means are connected in plurality along the arrangement direction of the plurality of works.

The carrier hand is thereby able to hold works with the outer walls or inner walls by either causing the pair of retaining means to approach each other or separate by way of the pressing means. The carrier hand can hold the outer circumference of works with the inner walls of the pairs of retaining means, or hold the inner circumference of works with the outer walls of the pairs of retaining means, even for works having a central portion that is hollow.

In addition, since a plurality of the pairs of retaining means and pressing means are connected along the arrangement direction of the plurality of works, a plurality of works can be held and carried simultaneously. Furthermore, even if differently shaped works are arranged, for example, for one such work, the outer circumference of the work can be held by the inner walls of the pair of retaining means, and for another work, the inner circumference of the work can be held by the outer walls of the pair of retaining means; therefore, differently shaped works can be held and carried simultaneously.

Consequently, it is possible to provide a carrier hand that can reliably transfer even a work having a central portion that is hollow, as well as can simplify the equipment.

According to a fourth aspect of the present invention, in the carrier hand as described in the third aspect, the work includes a valve seat and valve guide of an engine, and the pair of retaining means holds an inner circumference of the valve seat with the outer wall thereof, and holds an outer circumference of the valve guide with the inner wall thereof.

According to the fourth aspect of the invention, the carrier hand can hold and carry the outer circumference of the valve guide with the inner walls of the pair of retaining means, and hold the inner circumference of the valve seat with the outer walls of the pair of retaining means. In other words, the same carrier hand can be commonly used for carrying the valve seats and valve guides.

Consequently, it is possible to provide a carrier hand that can reliably carry even valve seats and valve guides having a central portion that is hollow, as well as can simplify the equipment.

According to the present invention, it is possible to provide a carrier device that can supply, at uneven intervals, a plurality of works arranged at even intervals. In addition, according to the present invention, it is possible to provide a carrier hand that can reliably carry even works having a central portion that is hollow, as well as can simplify the equipment.

BRIEF DESCRIPTION OF THE DRAWINGS

FIG. 7A is a view showing a state in which a valve guide is held by a first engaging part of a first retaining portion according to the embodiment, and FIG. 7B is a view looking up from below the first engaging part in the state shown in FIG. 7A;

FIG. 8A is a view showing a state in which a valve seat is held by the first engaging part of the first retaining portion according to the embodiment, and FIG. 8B is a view looking up from below the first engaging part in the state shown in FIG. 8A;

FIG. 9 is a view illustrating the electrical configuration of a control unit according to the embodiment;

DETAILED DESCRIPTION OF THE INVENTION

Hereinafter, a first embodiment of the present invention will be explained based on the appended drawings.

Figure 1:
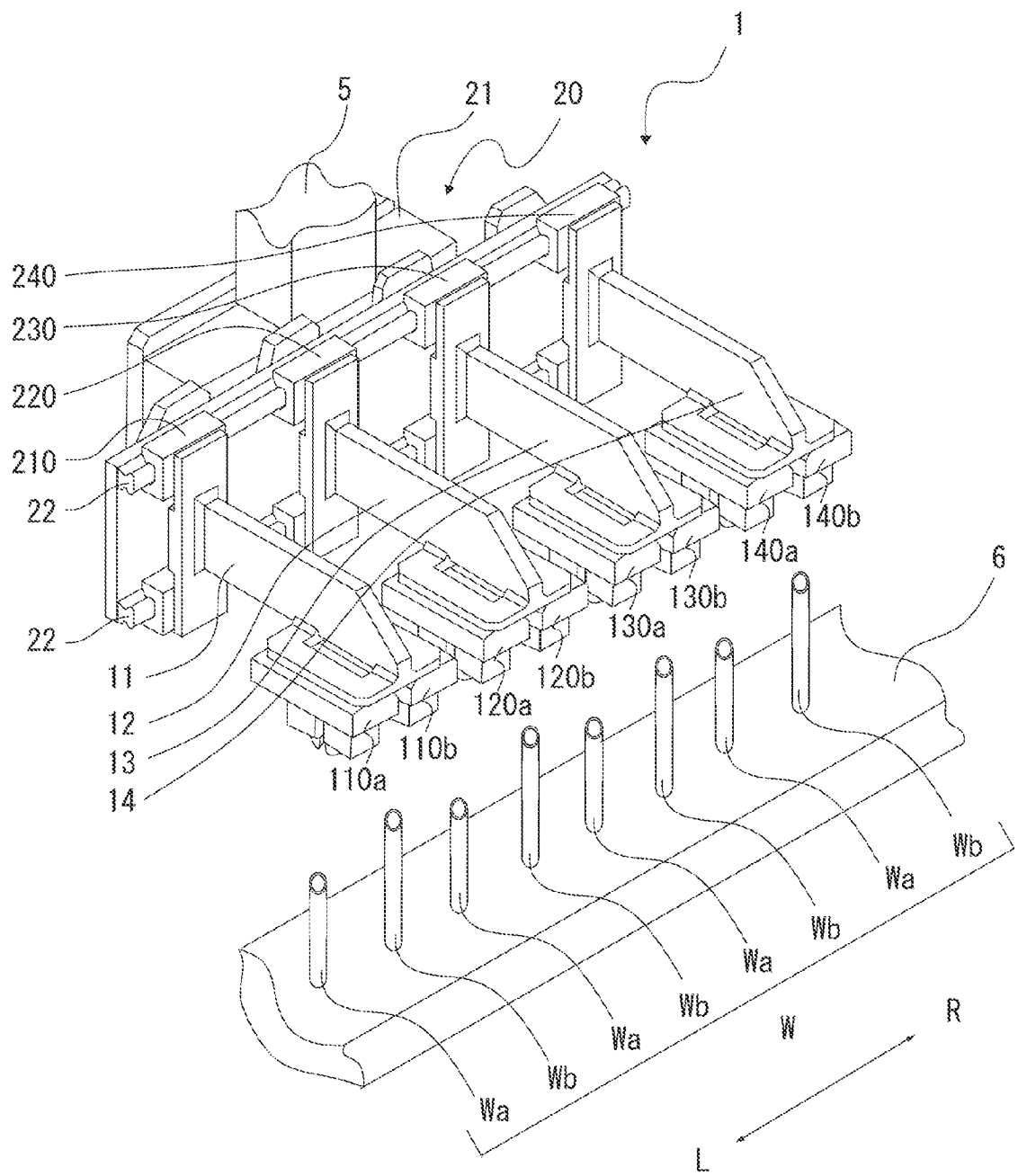
FIG. 1 is a view showing the configuration of a carrier device 1 according to a first embodiment of the present invention.

FIG. 1 is a view showing the configuration of a carrier device 1 according to one embodiment of the present invention.

The carrier device 1 holds a plurality of works W arranged at even intervals in a cutting pallet 6, and supplies these works W to a supply pallet 7 (refer to FIG. 2) serving as a supply portion with uneven intervals, by being moved by a robot arm 5. In the present embodiment, the carrier device 1 is used in the manufacturing process of engines to hold and carry works W, which are valve guides, from the cutting pallet 6, and supply the works W to the supply pallet 7 (refer to FIG. 2).

The carrier device 1 is provided with a first retaining portion 11, second retaining portion 12, third retaining portion 13 and fourth retaining portion 14 that hold a plurality of the works W, and a retaining base portion 20 to which this first retaining portion 11, second retaining portion 12, third retaining portion 13 and fourth retaining portion 14 are connected.

The first retaining portion 11 is provided with a first engaging part 110a that disengages with a work Wa, and a second engaging part 110b that disengages with a work Wb. The first engaging part 110a and second engaging part 110b include a pair of chucks (not illustrated) that approach and separate relative to each other, and disengage with the work Wa and work Wb by causing each of this pair of chucks to operate and approach or separate from each other so as to "tighten" or "loosen".

In the present embodiment, the work Wa and the work Wb are the same work W; however, in order to facilitate explanation, the work W disengaging with the first retaining portion will be referred to as the work Wa, and the work W disengaging with the second retaining portion will be referred to as the work Wb. Herein, the work Wa and the work Wb may be the same type of work, or may be different types of works from each other.

Similarly to the first retaining portion 11, the second retaining portion 12 is provided with a first engaging part 120a disengaging with the work Wa, and a second engaging part 120b disengaging with the work Wb; the third retaining portion 13 is provided with a first engaging part 130a disengaging with the work Wa, and a second engaging part 130b disengaging with the work Wb; and the fourth retaining portion 14 is provided with a first engaging part 140a disengaging with the work Wa, and a second engaging part 140b disengaging with the work Wb.

In the present embodiment, the four retaining portions of the first retaining portion 11, the second retaining portion 12, the third retaining portion 13 and the fourth retaining portion 14 are provided to the carrier device 1; however, it may be a different number of retaining portions. In addition, although two engaging parts 3 are provided to the first retaining portion 11, the second retaining portion 12, the third retaining portion 13 and the fourth retaining portion 14, respectively, in the present embodiment, it is not limited to two. Four engaging parts may be provided to each retaining portion. Four of the works could thereby be held, carried and supplied to the supply portion by one retaining portion.

Figure 3:
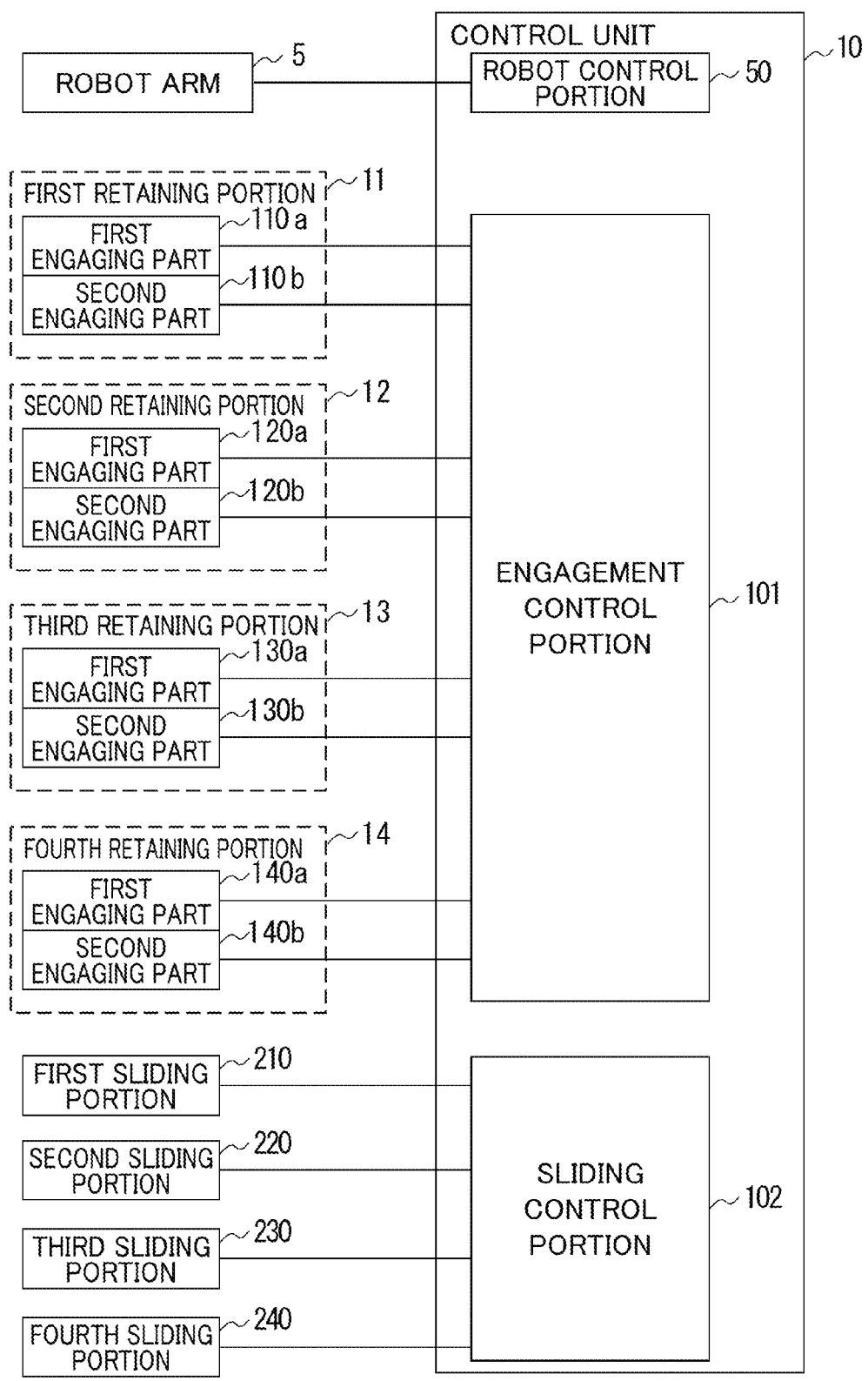
FIG. 3 is a view illustrating an electrical configuration of a control unit according to the embodiment.

The first engaging part 110a and the second engaging part 110b are each independently controlled by a control unit 10 (refer to FIG. 3). In other words, the first engaging part 110a disengages with the work Wa and the second engaging part 110b disengages with the work Wb at independent timings.

Similarly, the first engaging part 120a and the second engaging part 120b are each independently controlled by the control unit 10 (refer to FIG. 3). In other words, the first engaging part 120a disengages with the work Wa and the second engaging part 120b disengages with the work Wb at independent timings.

In addition, the first engaging part 130a and the second engaging part 130b are each independently controlled by the control unit 10 (refer to FIG. 3) in a similar way. In other words, the first engaging part 130a disengages with the work Wa and the second engaging part 130b disengages with the work Wb at independent timings.

Furthermore, the first engaging part 140a and the second engaging part 140b are each independently controlled by the control unit 10 (refer to FIG. 3) in a similar way. In other words, the first engaging part 140a disengages with the work Wa and the second engaging part 140b disengages with the work Wb at independent timings.

The retaining base portion 20 is provided with a retaining-base portion main body 21 that is connected to the robot arm 5; two rail portions 22 provided to the retaining-base portion main body 21 and extending in a direction (LR direction in FIG. 1) in which the works W are arranged in the cutting pallet 6; and first sliding portions 210, second sliding portions 220, third sliding portions 230 and fourth sliding portions 240 that engage with the rail portions 22 to be slidable.

The first sliding portions 210 are connected by the first retaining portion 11, and move in the L direction or R direction along the rail portions 22, according to the control of the control unit 10 (refer to FIG. 3). The first retaining portion 11 thereby moves in the arrangement direction (LR direction in FIG. 1) of the works W accompanying the movement of the first sliding portions 210.

The second sliding portions 220 are connected by the second retaining portion 12, and move this second retaining portion 12 in the L direction or R direction along the rail portions 22, according to the control of the control unit 10 (refer to FIG. 3). The second retaining portion 12 thereby moves in the arrangement direction (LR direction in FIG. 1) of the works W accompanying the movement of the second sliding portions 220.

The third sliding portions 230 are connected by the third retaining portion 13, and move this third retaining portion 13 in the L direction or R direction along the rail portions 22, according to the control of the control unit 10 (refer to FIG. 3). The third retaining portion 13 thereby moves in the arrangement direction (LR direction in FIG. 1) of the works W accompanying the movement of the third sliding portions 230.

The fourth sliding portions 240 are connected by the fourth retaining portion 14, and move this fourth retaining portion 14 in the L direction or R direction along the rail portions 22, according to the control of the control unit 10 (refer to FIG. 3). The fourth retaining portion 14 thereby moves in the arrangement direction (LR direction in FIG. 1) of the works W accompanying the movement of the fourth sliding portions 240.

In this way, the first sliding portions 210, second sliding portions 220, third sliding portions 230 and fourth sliding portions 240 cause the first retaining portion 11, second retaining portion 12, third retaining portion 13 and fourth retaining portion 14 to approach or separate from each other in the arrangement direction (LR direction in FIG. 1) of the works W.

The first sliding portions 210, second sliding portions 220, third sliding portions 230 and fourth sliding portions 240 are each provided with a motor (not illustrated) that is controlled by the control unit 10 (refer to FIG. 3) and a cam (not illustrated) that rotates according to this motor, and each moves in the L direction or R direction along the rail portions 22 to a predetermined position according to the rotation of this cam.

Figure 2A:
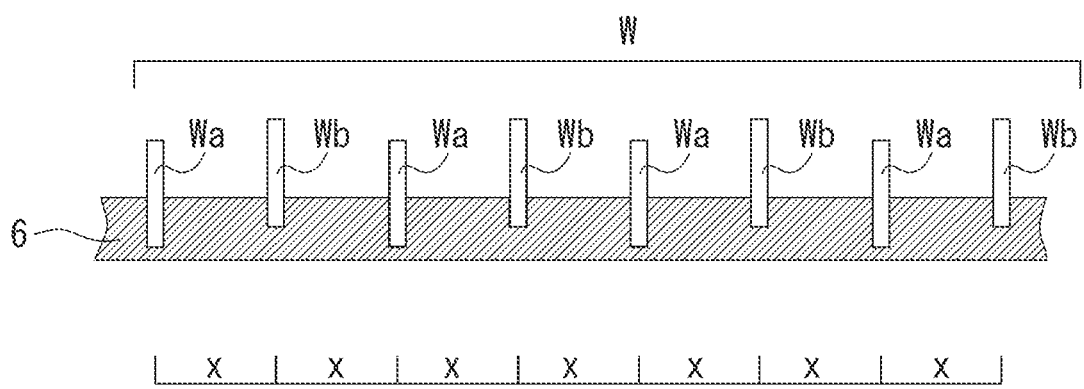
FIG. 2 is a view illustrating a cutting pallet and supply pallet according to the embodiment, with FIG. 2A being a cross-sectional view of the cutting pallet, and FIG. 2B being a cross-sectional view of the supply pallet.
Figure 2B:
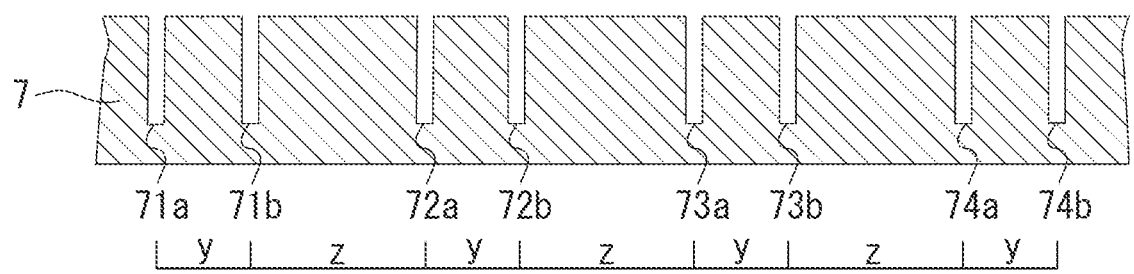

FIG. 2 is a view illustrating the cutting pallet 6 and the supply pallet 7 according to the present embodiment. FIG. 2A is a cross-sectional view of the cutting pallet 6. FIG. 2B is a cross-sectional view of the supply pallet 7.

In the cutting pallet 6, the works W (work Wa, work Wb) are arranged at even intervals with a predetermined interval x (e.g., 40 mm).

The supply pallet 7 is provided with a supply pallet hole 71a to which the work Wa engaged with the first engaging part 110a (refer to FIG. 1) is supplied, a supply pallet hole 71b to which the work Wb engaged with the second engaging part 110b (refer to FIG. 1) is supplied, a supply pallet hole 72a to which the work Wa engaged with the first engaging part 120a (refer to FIG. 1) is supplied, a supply pallet hole 72b to which the work Wb engaged with the second engaging part 120b (refer to FIG. 1) is supplied, a supply pallet hole 73a to which the work Wa engaged with the first engaging part 130a (refer to FIG. 1) is supplied, a supply pallet hole 73b to which the work Wb engaged with the second engaging part 130b (refer to FIG. 1) is supplied, a supply pallet hole 74a to which the work Wa engaged with the first engaging part 140a (refer to FIG. 1) is supplied, and a supply pallet hole 74b to which the work Wb engaged with the second engaging part 140b (refer to FIG. 1) is supplied.

The supply pallet hole 71a and supply pallet hole 71b; supply pallet hole 72a and supply pallet hole 72b; supply pallet hole 73a and supply pallet hole 73b; and supply pallet hole 74a and supply pallet hole 74b are formed to be respectively spaced by an interval y (e.g., 35 mm). In addition, the supply pallet hole 71b and supply pallet hole 72a; supply pallet hole 72b and supply pallet hole 73a; and supply pallet hole 73b and supply pallet hole 74a are formed to be respectively spaced by an interval z (e.g., 50 mm). In this way, the supply pallet hole 71a, supply pallet hole 71b, supply pallet hole 72a, supply pallet hole 72b, supply pallet hole 73a, supply pallet hole 73b, supply pallet hole 74a and supply pallet hole 74b to which the works W (work Wa and work Wb) are supplied are formed at uneven intervals in the supply pallet 7.

In the present embodiment, the supply pallet hole 71a, supply pallet hole 71b, supply pallet hole 72a, supply hole 72b, supply pallet hole 73a, supply pallet hole 73b, supply pallet hole 74a and supply pallet hole 74b to which the works W (work Wa and work Wb), which are valve guides, are supplied are formed at the same intervals as the intervals of the intake ports and exhaust ports formed in the cylinder head of an engine, which is the finished product of manufacturing. In other words, the intervals y and z are decided according to the intervals of the intake ports and exhaust ports formed in the cylinder head of the engine that is the finished product.

It should be noted that, although the interval of holes in the supply pallet 7 are established as the two of the interval y and the interval z in the present embodiment, the intervals y1, y2, y3, y4 . . . yn can be established in order from the supply pallet hole 71a side in FIG. 2B in place of the interval y, and the intervals z1, z2, z3 . . . zn can be established in order from the supply pallet hole 71b side in FIG. 2B in place of the interval z, to establish any interval such as all of the intervals being different.

Next, the electrical configuration of the control unit 10 will be explained while referring to FIG. 3.

FIG. 3 is a view illustrating the electrical configuration of the control unit 10 according to the present embodiment.

The control unit 10 is provided with a robot control portion 50 that controls the movement of the robot arm 5; an engagement control portion 101 that independently controls the first retaining portion 11, second retaining portion 12, third retaining portion 13 and fourth retaining portion 14; and a sliding control portion 102 that independently controls the first sliding portions 210, second sliding portions 220, third sliding portions 230 and fourth sliding portions 240.

The engagement control portion 101 is independently connected to the first engaging part 110a and second engaging part 110b of the first retaining portion 11, the first engaging part 120a and second engaging part 120b of the second retaining portion 12, the first engaging part 130a and second engaging part 130b of the third retaining portion 13, and the first engaging part 140a and second engaging part 140b of the fourth retaining portion 14, respectively, and controls the operation to cause the works W (refer to FIG. 1) to be disengaged at independent timings, respectively.

The sliding control portion 102 is independently connected to the first sliding portions 210, second sliding portions 220, third sliding portions 230 and fourth sliding portions 240, respectively, and controls the movements of independent predetermined distances, respectively.

Next, operation of the carrier device 1 will be explained while referring to FIGS. 4 and 5.

Figure 4A:
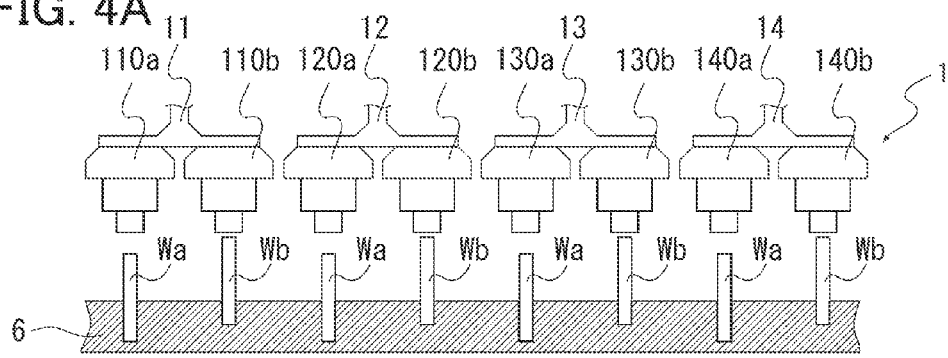
FIG. 4 is a view illustrating operation of the carrier device to hold a plurality of works arranged at even intervals in the cutting pallet, and carry to the supply pallet, with FIG. 4A being a view showing a state in which the carrier device is disposed above the plurality of works arranged at even intervals in the cutting pallet, FIG. 4B being a view showing a state in which the carrier device is holding the plurality of works, and FIG. 4C being a view showing a state in which the carrier device has carried the plurality of works to the supply pallet, and a portion of the plurality of works match predetermined positions on the supply pallet.
Figure 4B:
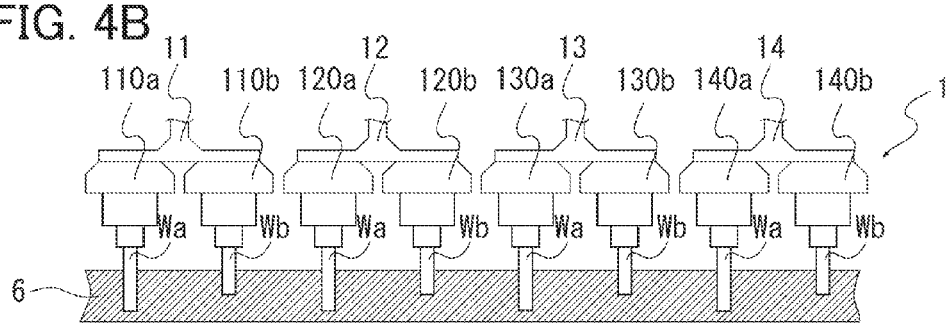
Figure 4C:
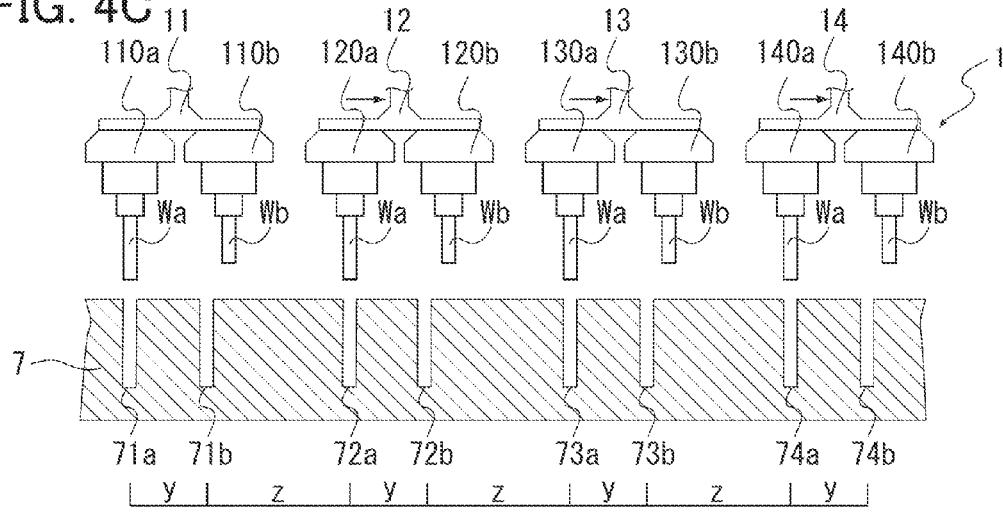

FIG. 4 is a view illustrating operations of the carrier device 1 to hold the plurality of works Wa and Wb arranged at even intervals on the cutting pallet 6, and to carry these to the supply pallet 7. FIG. 4A is a view showing a state in which the carrier device 1 is disposed above the plurality of works Wa and Wb arranged at even intervals in the cutting pallet 6. FIG. 4B is a view showing a state in which the carrier device 1 is holding the plurality of works Wa and Wb. FIG. 4C is a view showing a state in which the carrier device 1 has carried the plurality of works Wa and Wb to the supply pallet 7, and the plurality of works Wa match predetermined positions on the supply pallet 7.

Figure 5A:
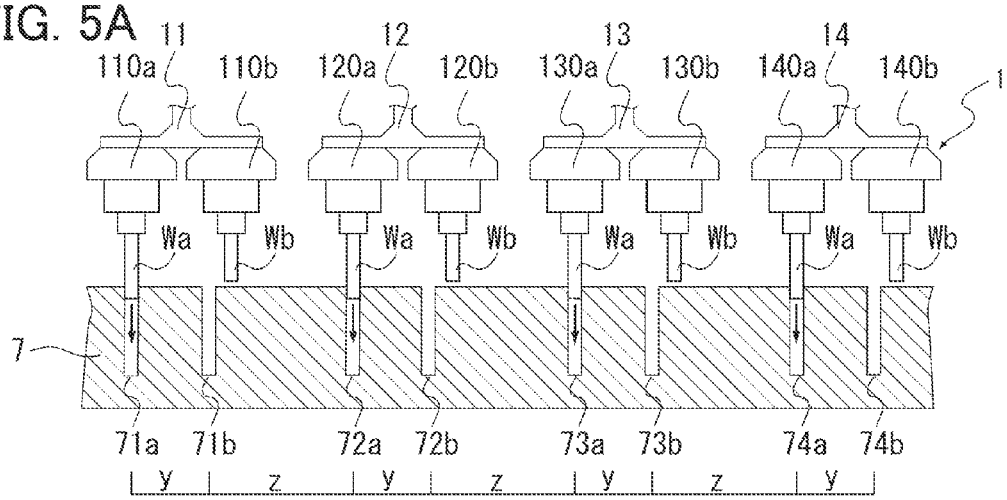
FIG. 5 is a view illustrating operation of the carrier device to supply to the supply pallet the works carried to the supply pallet, with FIG. 5A being a view showing a state in which the carrier device has supplied a portion of the plurality of works to predetermined positions on the supply pallet, FIG. 5B being a view showing a state in which the carrier device has made a portion of the plurality of works match predetermined positions on the supply pallet, and FIG. 5C being a view showing a state in which the carrier device has supplied a portion of the plurality of works to predetermined positions on the supply pallet.
Figure 5B:
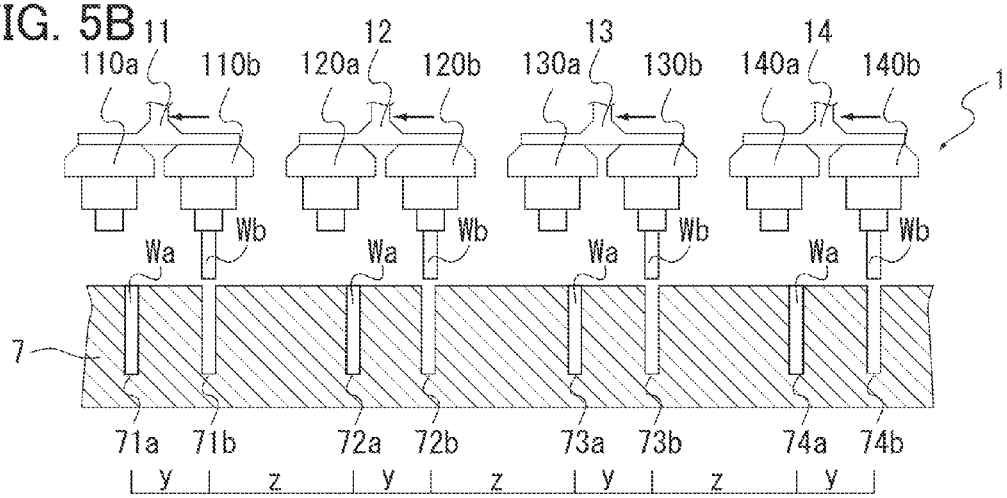
Figure 5C:
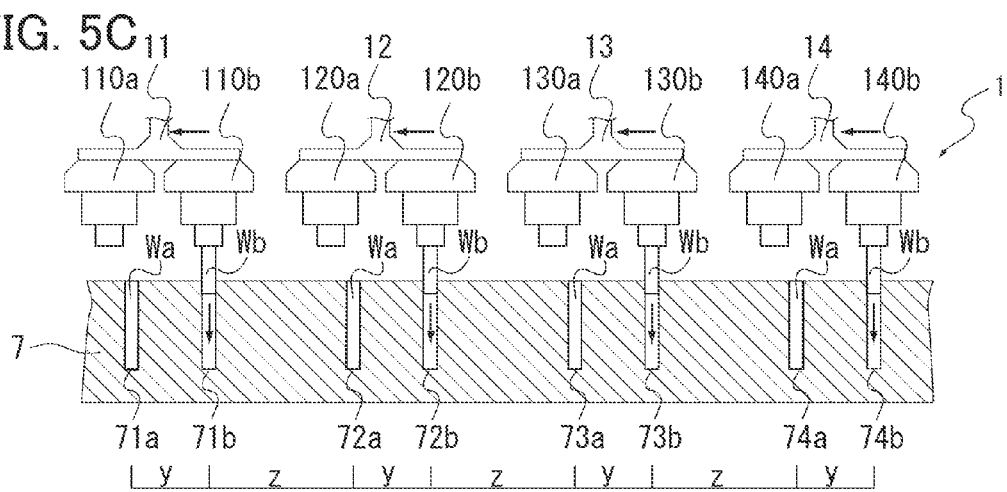

FIG. 5 is a view illustrating operations of the carrier device 1 to supply to the supply pallet 7 the works Wa and Wb carried to the supply pallet. FIG. 5A is a view showing a state in which the carrier device 1 has supplied the plurality of works Wa to predetermined positions on the supply pallet 7. FIG. 5B is a view showing a state in which the carrier device 1 has made the plurality of works Wb match predetermined positions on the supply pallet 7. FIG. 5C is a view showing a state in which the carrier device 1 has supplied the plurality of works Wb to predetermined positions on the supply pallet 7.

First, as shown in FIG. 4A, the carrier device 1 is disposed, by way of the robot arm 5 (refer to FIG. 1), above the plurality of works Wa and Wb arranged at the even interval x (e.g., 40 mm) from each other in the cutting pallet 6. At this time, the first engaging part 110a and the second engaging part 110b of the first retaining portion 11, the first engaging part 120a and the second engaging part 120b of the second retaining portion 12, the first engaging part 130a and the second engaging part 130b of the third retaining portion 13, and the first engaging part 140a and the second engaging part 140b of the fourth retaining portion 14 are disposed at even intervals x from each other. In addition, the works Wb in the cutting pallet 6 are inserted into the cutting pallet 6 to be shallow compared to the works Wa.

Next, as shown in FIG. 4B, the carrier device 1 is brought close, by way of the robot arm 5 (refer to FIG. 1), to the plurality of works Wa and Wb that are arranged in the cutting pallet 6, and hold the plurality of works Wa and Wb according to the control of the engagement control portion 101 (refer to FIG. 3). More specifically, the first engaging part 110a, first engaging part 120a, first engaging part 130a and first engaging part 140a engage with works Wa, respectively. In addition, the second engaging part 110b, second engaging part 120b, second engaging part 130b and second engaging part 140b engage with the works Wb, respectively. At this time, the length of the works Wa protruding from the carrier device 1 is longer than the length by which the works Wb are protruding from the carrier device 1.

Next, as shown in FIG. 4C, the carrier device 1 carries the plurality of works Wa and Wb thus held to the supply pallet 7 by way of the robot arm 5 (refer to FIG. 1). At this time, according to the control of the sliding control portion 102 (refer to FIG. 3), the carrier device 1 disposes the work Wa engaged with the first engaging part 110a above the supply pallet hole 71a of the supply pallet 7, disposes the work Wa engaged with the first engaging part 120a above the supply pallet hole 72a of the supply pallet 7, disposes the work Wa engaged with the first engaging part 130a above the supply pallet hole 73a of the supply pallet 7, and disposes the work Wa engaged with the first engaging part 140a above the supply pallet hole 74a of the supply pallet 7.

Next, as shown in FIG. 5A, the carrier device 1 is brought close to the supply pallet 7 by way of the robot arm 5 (refer to FIG. 1). A leading end portion of the work Wa engaged with the first engaging part 110a is thereby inserted in the supply pallet hole 71a. A leading end portion of the work Wa engaged with the first engaging part 120a is thereby inserted in the supply pallet hole 72a. A leading end portion of the work Wa engaged with the first engaging part 130a is thereby inserted in the supply pallet hole 73a. A leading end portion of the work Wa engaged with the first engaging part 140a is thereby inserted in the supply pallet hole 74a. Herein, the leading end portion of the work Wa is a portion that is longer than the length by which the work Wb projects from the carrier device 1.

Thereafter, according to the control of the engagement control portion 101 (refer to FIG. 3), the carrier device 1 releases the engagement with the works Wa of the first engaging part 110a, first engaging part 120a, first engaging part 130a and first engaging part 140a. The works Wa engaged with the first engaging part 110a, first engaging part 120a, first engaging part 130a and first engaging part 140a thereby drop down to be supplied to the supply pallet hole 71a, supply pallet hole 72a, supply pallet hole 73a and supply pallet hole 74a, respectively.

In this way, with the works Wa engaged with the first engaging part 110a, first engaging part 120a, first engaging part 130a and first engaging part 140a set to arbitrary intervals (y+z), and these works Wa defined as a first group, the carrier device 1 supplies the works Wa of this first group to the supply pallet 7 all at once, according to the control of the sliding control portion 102 (refer to FIG. 3).

In addition, as previously explained, in a case of the interval of holes in the supply pallet 7 being set with the intervals y1, y2, y3, y4 . . . yn established in order from the supply pallet hole 71a side in FIG. 2B in place of the interval y, and the intervals z1, z2, z3 . . . zn established in order from the supply pallet hole 71b side in FIG. 2B in place of the interval z, a predetermined interval of works Wa engaged in the first engaging part 110a and first engaging part 120a becomes y1+z1, a predetermined interval of works Wa engaged in the first engaging part 120a and the first engaging part 130a becomes y2+z2, and a predetermined interval of works Wa engaged in the first engaging part 130a and first engaging part 140a becomes y3+z3.

Next, as shown in FIG. 5B, according to the control of the sliding control portion 102 (refer to FIG. 3), the carrier device 1 disposes the work Wb engaged with the second engaging part 110b above the supply pallet hole 71b of the supply pallet 7, disposes the work Wb engaged with the second engaging part 120b above the supply pallet hole 72b of the supply pallet 7, disposes the work Wb engaged with the second engaging part 130b above the supply pallet hole 73b of the supply pallet 7, and disposes the work Wb engaged with the second engaging part 140b above the supply pallet hole 74b of the supply pallet 7.

In this way, by setting the works Wa engaging with the first engaging part 110a, first engaging part 120a, first engaging part 130a and first engaging part 140a so as to have a length projecting from the carrier device 1 that is longer compared to the works Wb engaged with the second engaging part 110b, second engaging part 120b, second engaging part 130b and second engaging part 140b, the works Wb engaged with the second engaging part 110b, second engaging part 120b, second engaging part 130b and second engaging part 140b can be prevented from interfering with the supply pallet 7, even if moving the second engaging part 110b, second engaging part 120b, second engaging part 130b and second engaging part 140b after supplying the works Wa to the supply pallet hole 71a, supply pallet hole 72a, supply pallet hole 73a and supply pallet hole 74a.

It should be noted that, even if the lengths of the works Wa and works Wb projecting from the carrier device 1 are equal, it is possible to prevent the works Wb engaged with the second engaging part 110b, second engaging part 120b, second engaging part 130b and second engaging part 140b from interfering with the supply pallet 7 after supplying the works Wa to the supply pallet hole 71a, supply pallet hole 72a, supply pallet hole 73a and supply pallet hole 74a, even if the carrier device 1 is separated from the supply pallet 7 by way of the robot arm 5 (refer to FIG. 1), and then the second engaging part 110b, second engaging part 120b, second engaging part 130b and second engaging part 140b are moved.

Next, as shown in FIG. 5C, the carrier device 1 is brought close to the supply pallet 7 by way of the robot arm 5 (refer to FIG. 1). The leading end portion of the work Wb engaged with the second engaging part 110b is thereby inserted in the supply pallet hole 71b. The leading end portion of the work Wb engaged with the second engaging part 120b is thereby inserted in the supply pallet hole 72b. The leading end portion of the work Wb engaged with the second engaging part 130b is thereby inserted in the supply pallet hole 73b. The leading end portion of the work Wb engaged with the second engaging part 140b is thereby inserted in the supply pallet hole 74b.

Thereafter, according to the control of the engagement control portion 101 (refer to FIG. 3), the carrier device 1 releases the engagement with the works Wb of the second engaging part 110b, second engaging part 120b, second engaging part 130b and second engaging part 140b. The works Wb engaged with the second engaging part 110b, second engaging part 120b, second engaging part 130b and second engaging part 140b thereby drop down to be supplied to the supply pallet hole 71b, supply pallet hole 72b, supply pallet hole 73b and supply pallet hole 74b, respectively.

In this way, with works Wb engaged in the second engaging part 110b, second engaging part 120b, second engaging part 130b and second engaging part 140b set at predetermined intervals (z+y), and these works Wb defined as a second group, the carrier device 1 supplies the works Wb of this second group to the supply pallet 7 all at once in accordance with the control of the sliding control portion 102 (refer to FIG. 3).

In addition, as previously explained, in a case of the interval of holes in the supply pallet 7 being set with the intervals y1, y2, y3, y4 . . . yn established in order from the supply pallet hole 71a side in FIG. 2B in place of the interval y, and the intervals z1, z2, z3 . . . zn established in order from the supply pallet hole 71b side in FIG. 2B in place of the interval z, a predetermined interval of works Wb engaged in the second engaging part 110b and second engaging part 120b becomes z1+y2, a predetermined interval of works Wb engaged in the second engaging part 120b and the second engaging part 130b becomes z2+y3, and a predetermined interval of works Wb engaged in the second engaging part 130b and second engaging part 140b becomes z3+y4.

The following functional effects are exerted according to the present embodiment.

The carrier device 1 of the present embodiment holds and carries a plurality of works W arranged at even intervals, and supplies them to the supply pallet 7 at any intervals. In addition, the carrier device 1 includes the first sliding portions 210, second sliding portions 220, third sliding portions 230 and fourth sliding portions 240 that cause the first retaining portion 11, second retaining portion 12, third retaining portion 13 and fourth retaining portion 14 holding the works W to approach and separate from each other in the arrangement direction of the works W. The first engaging part 110a and second engaging part 110b, the first engaging part 120a and second engaging part 120b, the first engaging part 130a and second engaging part 130b, and the first engaging part 140a and second engaging part 140b that independently disengage the works are provided to the first regarding portion 11, second retaining portion 12, third retaining portion 13, and fourth retaining portion 14, respectively.

The carrier device holds the plurality of works W arranged at even intervals by the first engaging part 110a and second engaging part 110b of the first retaining portion 11, first engaging part 120a and second engaging part 120b of the second retaining portion 12, first engaging part 130a and second engaging part 130b of the third retaining portion 13, and first engaging part 140a and second engaging part 140b of the fourth retaining portion 14, and can thereby supply the works W to the supply pallet 7 after causing the first retaining portion 11, second retaining portion 12, third retaining portion 13 and fourth retaining portion 14 holding the works W to respectively approach and separate from each other via the first sliding portions 210, second sliding portions 220, third sliding portions 230 and fourth sliding portions 240, so that the interval of the plurality of works W held becomes the interval of works W to be supplied to the supply pallet 7. In other words, the plurality of works W held by the first retaining portion 11, second retaining portion 12, third retaining portion 13 and fourth retaining portion 14 are divided into the works Wa of a first group and the works Wb of a second group, and can be supplied in groups to the supply pallet 7 at any intervals.

Therefore, it is possible to provide a carrier device that can supply, at uneven intervals, a plurality of works arranged at even intervals.

In addition, a transfer method for supplying a plurality of the works W arranged at even intervals to the supply pallet 7 at arbitrary intervals according to the present embodiment includes: a step of holding a plurality of the works W with the first engaging part 110a and second engaging part 110b, first engaging part 120a and second engaging part 120b, first engaging part 130a and second engaging part 130b, and first engaging part 140a and second engaging part 140b provided to the first retaining portion 11, second retaining portion 12, third retaining portion 13 and fourth retaining portion 14, respectively; a step of transferring the plurality of works W to the supply pallet 7; a step of setting the works Wa, which is one portion among the plurality of works W held in the first engaging part 110a and second engaging part 110b, first engaging part 120a and second engaging part 120b, first engaging part 130a and second engaging part 130b, and first engaging part 140a and second engaging part 140b, to predetermined intervals by driving the first sliding portions 210, second sliding portions 220, third sliding portions 230 and fourth sliding portions 240 to cause the first retaining portion 11, second retaining portion 12, third retaining portion 13 and fourth retaining portion 14 to approach or separate from each other in the arrangement direction of the plurality of works W; a step of supplying the works Wa to the supply pallet 7; a step of setting works Wb, which is another portion of the plurality of works W held in the first engaging part 110a and second engaging part 110b, first engaging part 120a and second engaging part 120b, first engaging part 130a and second engaging part 130b, and first engaging part 140a and second engaging part 140b, to predetermined intervals by driving the first sliding portions 210, second sliding portions 220, third sliding portions 230 and fourth sliding portions 240 to cause the first retaining portion 11, second retaining portion 12, third retaining portion 13 and fourth retaining portion 14 to approach or separate from each other in the arrangement direction of the plurality of works W; and a step of supplying the works Wb to the supply pallet 7.

After causing the first retaining portion 11, second retaining portion 12, third retaining portion 13 and fourth retaining portion 14 to approach or separate from each order in order to set the works Wa, among the plurality of works W held in the first engaging part 110a and second engaging part 110b, first engaging part 120a and second engaging part 120b, first engaging part 130a and second engaging part 130b, and first engaging part 140a and second engaging part 140b, respectively, to predetermined intervals, they can be supplied to the supply pallet 7. After causing the first retaining portion 11, second retaining portion 12, third retaining portion 13 and fourth retaining portion 14 to approach or separate from each order in order to set the works Wb, among the plurality of works W held in the first engaging part 110a and second engaging part 110b, first engaging part 120a and second engaging part 120b, first engaging part 130a and second engaging part 130b, and first engaging part 140a and second engaging part 140b, respectively, to predetermined intervals, they can be supplied to the supply pallet 7.

Therefore, it is possible to provide a transfer method that can supply, at uneven intervals, a plurality of works arranged at even intervals.

Hereinafter, a second embodiment of the present invention will be explained based on the appended drawings.

Figure 6:
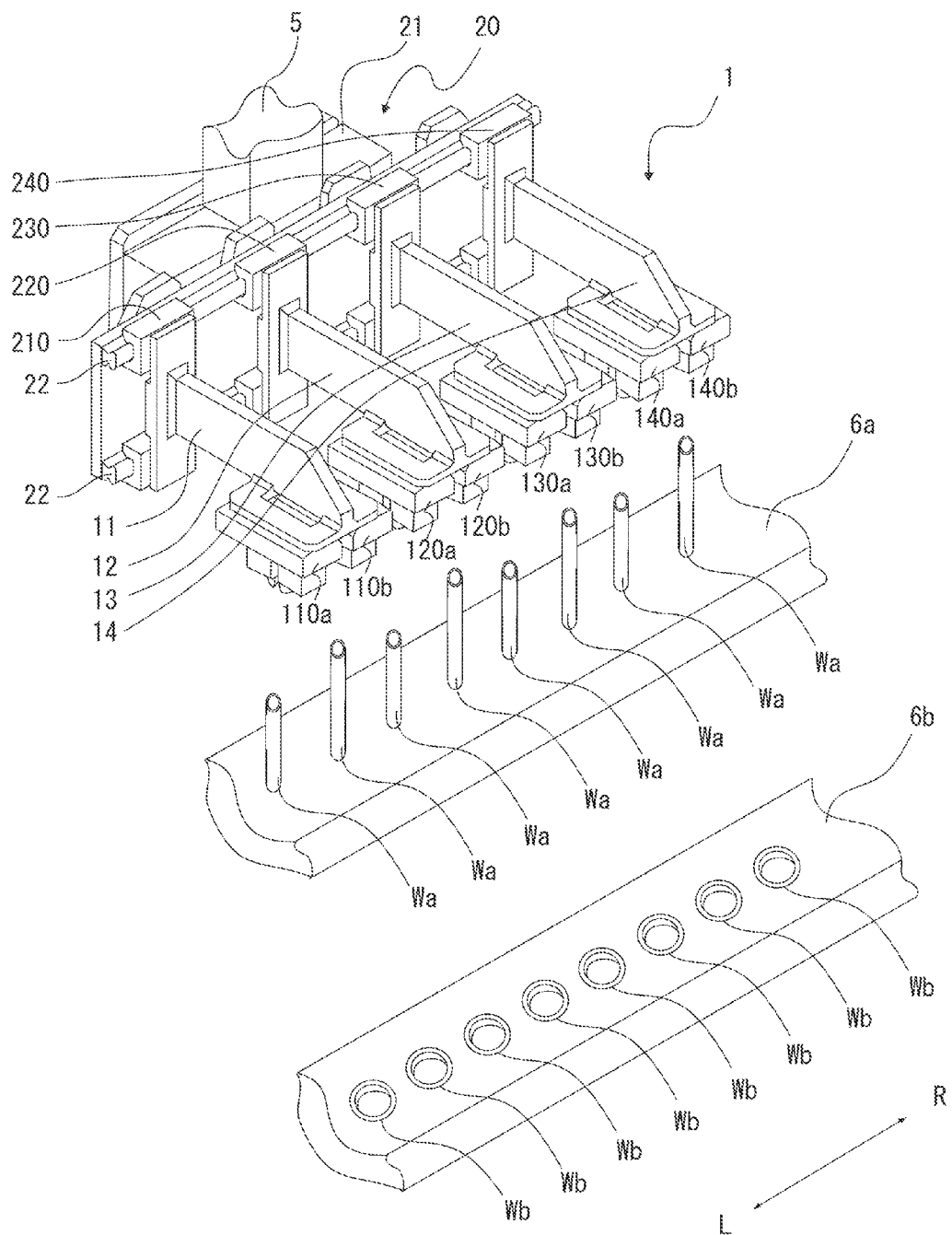
FIG. 6 is view showing the configuration of a carrier device according to a second embodiment of the present invention.

FIG. 6 is a view showing the configuration of a carrier device 1 according to an embodiment of the present invention.

The carrier device 1 holds a plurality of valve guides Wa arranged at even intervals in a cutting pallet 6a and a plurality of valve seats Wb arranged in a cutting pallet 6b, and supplies the valve guides Wa to a supply pallet 7a (refer to FIG. 10) and the valve seats Wb to a supply pallet 7b (refer to FIG. 11) by being moved by the robot arm 5.

The carrier device 1 is provided with the first retaining portion 11, second retaining portion 12, third retaining portion 13 and fourth retaining portion 14 as carrier hands that hold the plurality of valve guides Wa or valve seats Wb, and a retaining base portion 20 to which this first retaining portion 11, second retaining portion 12, third retaining portion 13 and fourth retaining portion 14 are connected.

The first retaining portion 11 is provided along an arrangement direction (arrow LR direction in FIG. 6) of the plurality of valve guides Wa or valve seats Wb, and includes the first engaging part 110a and second engaging part 110b that disengage with these.

Similarly to the first retaining portion 11, the second retaining portion 12 is provided along the arrangement direction (arrow LR direction in FIG. 6) of the plurality of valve guides Wa or valve seats Wb, and includes the first engaging part 120a and second engaging part 120b that disengage with these. The third retaining portion 13 is provided along the arrangement direction (arrow LR direction in FIG. 6) of the plurality of valve guides Wa or valve seats Wb, and includes the first engaging part 130a and second engaging part 130b that disengage with these. The fourth retaining portion 14 is provided along the arrangement direction (arrow LR direction in FIG. 6) of the plurality of valve guides Wa or valve seats Wb, and includes a first engaging part 140a and second engaging part 140b that disengage with these.

In the present embodiment, the four retaining portions of the first retaining portion 11, the second retaining portion 12, the third retaining portion 13 and the fourth retaining portion 14 are provided to the carrier device 1; however, it may be a different number of retaining portions. In addition, although two engaging parts are provided to the first retaining portion 11, the second retaining portion 12, the third retaining portion 13 and the fourth retaining portion 14, respectively, in the present embodiment, it is not limited to two. Four engaging parts may be provided to each retaining portion. Four of the valve guides Wa or valve seats Wb could thereby be held, carried and supplied to the supply portion by one retaining portion.

The configuration of the first engaging part 110a of the first retaining portion 11 will be explained while referring to FIGS. 7 and 8.

FIGS. 7 and 8 are views illustrating the configuration of the first engaging part 110a of the first retaining portion 11 according to the present embodiment.

FIG. 7A is a view showing a state in which a valve guide Wa is held by the first engaging part 110a of the first retaining portion 11. FIG. 7B is a view looking up from below the first engaging part 110a in the state shown in FIG. 7A.

FIG. 8A is a view showing a state in which a valve seat Wb is held by the first engaging part 110a of the first retaining portion 11 according to the embodiment. FIG. 8B is a view looking up from below the first engaging part 110a in the state shown in FIG. 8A.

The first engaging part 110a includes a pair of retaining means 101 for disengaging the valve guide Wa or valve seat Wb, and a pressing means 102 for causing the pair of retaining means 101 to approach or separate from each other around substantially the center of the first engaging part 110a (dashed line C in FIGS. 7 and 8).

The retaining means 101 include an outer wall 101a of substantially semicircular shape, and an inner wall 101b of substantially semicircular shape with a diameter smaller than that of the outer wall 101a.

The pressing means 102 includes a guide portion 102a that extends in a direction (arrow BF direction in FIGS. 7 and 8) orthogonal to the arrangement direction (arrow LR direction in FIG. 6) of the plurality of valve guides Wa or valve seats Wb, and to which the retaining means 101 slidably engage; and a pressing means main body 102b that causes the pair of retaining means 101 to move along this guide portion 102a so as to approach or separate from each other. The pressing means main body 102b has an air compressor (not illustrated) connected thereto via an air hose (not illustrated), and is an air cylinder that makes the pair of retaining means 101 approach each other or separate using the compressed air supplied from this air compressor.

As shown in FIG. 7, the first engaging part 110a holds the valve guide Wa by causing the pair of retaining means 101 to approach each other (from 0 to C direction in FIG. 7) to sandwich the outer circumference of the valve guide Wa with the inner walls 101b of the pair of retaining means 101.

In addition, as shown in FIG. 8, the first engaging part 110a holds the valve seat Wb by causing the pair of retaining means 101 to separate from each other, and applying force to the inner circumference of the valve seat Wb from the center thereof to the outside (from C to 0 direction in FIG. 7) by way of the outer walls 101a of the pair of retaining means 101.

Referring back to FIG. 6, the second engaging part 110b, similarly to the first engaging part 110a, includes a pair or retaining means, and a pressing means for causing the pair of retaining means to approach each other or separate.

In other words, the pair of retaining means and the pressing means of the first engaging part 110a, and the pair of retaining means and the pressing means of the second engaging part 110b are provided in a coupled manner to the first retaining portion 11 along the arrangement direction of the plurality valve guides Wa or valve seats Wb.

Similarly to the first retaining portion 11, the second retaining portion 12, third retaining portion 13 and fourth retaining portion 14 include a pair of retaining means, and a pressing means for causing the pair of retaining means to approach each other or separate; however, explanations thereof will be omitted due to being the same configuration as the first retaining portion 11.

The first engaging part 110a and second engaging part 110b are independently controlled by a control unit 10 (refer to FIG. 9). In other words, the first engaging part 110a and second engaging part 110b disengage with the valve guide Wa or valve seat Wb at independent timings. More specifically, the control unit 10 (refer to FIG. 9), for example, controls the driving of the pressing means 102 (refer to FIG. 7) of the first engaging part 110a, whereby the pair of retaining means 101 (refer to FIG. 7) approach each other or separate to disengage the valve guide Wa or valve seat Wb.

Similarly, the first engaging part 120a and second engaging part 120b are independently controlled by the control unit 10 (refer to FIG. 9). In other words, the first engaging part 120a and second engaging part 120b disengage with the valve guide Wa or valve seat Wb at independent timings.

In addition, the first engaging part 130a and second engaging part 130b are independently controlled by the control unit 10 (refer to FIG. 9) in a similar way. In other words, the first engaging part 130a and second engaging part 130b disengage with the valve guide Wa or valve seat Wb at independent timings.

Furthermore, the first engaging part 140a and second engaging part 140b are independently controlled by the control unit 10 (refer to FIG. 9) in a similar way. In other words, the first engaging part 140a and second engaging part 140b disengage with the valve guide Wa or valve seat Wb at independent timings.

The retaining base portion 20 is provided with a retaining-base portion main body 21 that is connected to the robot arm 5; two rail portions 22 provided to the retaining-base portion main body 21 and extending in a direction (LR direction in FIG. 6) in which the valve guides Wa are arranged in the cutting pallet 6a or in a direction (LR direction in FIG. 6) in which the valve seats Wb are arranged in the cutting pallet 6b; and first sliding portions 210, second sliding portions 220, third sliding portions 230 and fourth sliding portions 240 that engage with the rail portions 22 to be slidable.

The first sliding portions 210 are connected by the first retaining portion 11, and move in the L direction or R direction along the rail portions 22, according to the control of the control unit 10 (refer to FIG. 9). The first retaining portion 11 thereby moves in the arrangement direction (LR direction in FIG. 6) of the valve guides Wa or valve seats Wb accompanying the movement of the first sliding portions 210.

The second sliding portions 220 are connected by the second retaining portion 12, and move this second retaining portion 12 in the L direction or R direction along the rail portions 22, according to the control of the control unit 10 (refer to FIG. 9). The second retaining portion 12 thereby moves in the arrangement direction (LR direction in FIG. 6) of the valve guides Wa or valve seats Wb accompanying the movement of the second sliding portions 220.

The third sliding portions 230 are connected by the third retaining portion 13, and move this third retaining portion 13 in the L direction or R direction along the rail portions 22, according to the control of the control unit 10 (refer to FIG. 9). The third retaining portion 13 thereby moves in the arrangement direction (LR direction in FIG. 6) of the valve guides Wa or valve seats Wb accompanying the movement of the third sliding portions 230.

The fourth sliding portions 240 are connected by the fourth retaining portion 14, and move this fourth retaining portion 14 in the L direction or R direction along the rail portions 22, according to the control of the control unit 10 (refer to FIG. 9). The fourth retaining portion 14 thereby moves in the arrangement direction (LR direction in FIG. 6) of the valve guides Wa or valve seats Wb accompanying the movement of the fourth sliding portions 240.

In this way, the first sliding portions 210, second sliding portions 220, third sliding portions 230 and fourth sliding portions 240 cause the first retaining portion 11, second retaining portion 12, third retaining portion 13 and fourth retaining portion 14 to approach or separate from each other in the arrangement direction (LR direction in FIG. 6) of the valve guides Wa or valve seats Wb.

The first sliding portions 210, second sliding portions 220, third sliding portions 230 and fourth sliding portions 240 are each provided with a motor (not illustrated) that is controlled by the control unit 10 (refer to FIG. 9) and a cam (not illustrated) that rotates by way of this motor, and each moves in the L direction or R direction along the rail portions 22 according to the rotation of this cam.

Next, the electrical configuration of the control unit 10 will be explained while referring to FIG. 9.

FIG. 9 is a view illustrating the electrical configuration of the control unit 10 according to the present embodiment.

The control unit 10 is provided with a robot control portion 50 that controls the movement of the robot arm 5; an engagement control portion 100 that independently controls the first retaining portion 11, second retaining portion 12, third retaining portion 13 and fourth retaining portion 14; and a sliding control portion 200 that independently controls the first sliding portions 210, second sliding portions 220, third sliding portions 230 and fourth sliding portions 240.

The engagement control portion 100 is independently connected to the first engaging part 110a and second engaging part 110b of the first retaining portion 11, the first engaging part 120a and second engaging part 120b of the second retaining portion 12, the first engaging part 130a and second engaging part 130b of the third retaining portion 13, and the first engaging part 140a and second engaging part 140b of the fourth retaining portion 14, and controls the driving of the pressing means (refer to FIGS. 7 and 8) so as to cause the pair of retaining means 101 (refer to FIGS. 7 and 8) to move in a direction (from 0 to C direction in FIG. 7 or from C to 0 direction in FIG. 8) established in advance depending on the type of works (e.g., valve guides Wa (refer to FIG. 6) or valve seats Wb (refer to FIG. 6)). More specifically, the engagement control portion 100 controls the driving of the air compressor (not illustrated) to cause compressed air to be supplied from this air compressor to the pressing means main body 102b (refer to FIGS. 7 and 8) to which the pressing means 102 of the first engaging part 110a is provided, whereby the pair of retaining means 101 (refer to FIGS. 7 and 8) approach or separate from each other to disengage the valve guide Wa or valve seat Wb (refer to FIGS. 7 and 8).

The sliding control portion 200 is independently connected to the first sliding portions 210, second sliding portions 220, third sliding portions 230 and fourth sliding portions 240, respectively, and controls the movements of independent distances at independent timings, respectively.

The operations of the first retaining portion 11 will be explained while referring to FIGS. 10 and 11.

First, the operations of the first retaining portion 11 to hold and carry the valve guides Wa arranged in the cutting pallet 6a to supply them to the supply pallet 7a will be explained while referring to FIG. 10.

Figure 10A:
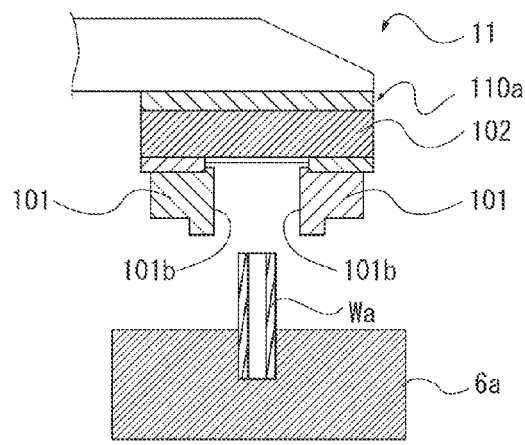
FIG. 10A is a view showing a state in which the first retaining portion is disposed above a valve guide arranged in a cutting pallet.
Figure 10B:
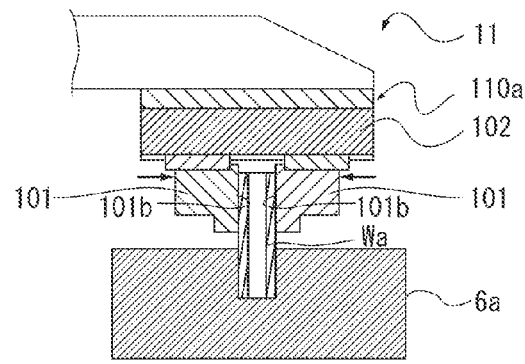
FIG. 10B is a view showing a state in which the first retaining portion holds the valve guide.
Figure 10C:
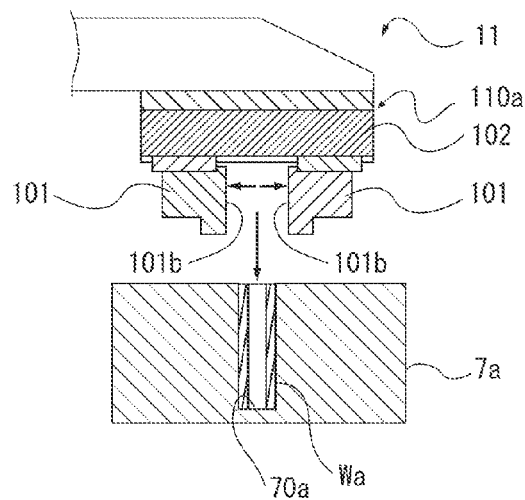
FIG. 10C is a view showing a state in which the first retaining portion has carried and supplied the valve guide to a supply pallet at a predetermined location.

FIG. 10A is a view showing a state in which the first retaining portion 11 is disposed above the valve guide Wa arranged in a cutting pallet 6a. FIG. 10B is a view showing a state in which the first retaining portion 11 holds the valve guide Wa. FIG. 10C is a view showing a state in which the first retaining portion 11 has carried and supplied the valve guide Wa to a supply pallet 7a at predetermined locations.

First, the first retaining portion 11 is disposed above the valve guide Wa arranged in the cutting pallet 6a, by way of the robot arm 5 (refer to FIG. 6), as shown in FIG. 10A. At this time, the pair of retaining means 101 of the first engaging part 110a of the first retaining portion 11 is disposed in a state in which the distance between the inner walls 101b is greater than the outside diameter of the valve guide Wa.

Next, as shown in FIG. 10B, the first retaining portion 11 is brought close to the valve guide Wa disposed in the cutting pallet 6a by way of the robot arm 5 (refer to FIG. 6), and according to the driving control of the pressing means 102 by the engagement control portion 100 (refer to FIG. 9), causes the pair of retaining means 101 to approach each other, whereby the outer circumference of the valve guide Wa is engaged with the inner walls 101b of the pair of retaining means 101 to hold the valve guide Wa.

Next, as shown in FIG. 10C, the first retaining portion 11 carries the valve guide Wa thus held to be above the supply pallet hole 70a formed in the supply pallet 7a to which the valve guide Wa is to be supplied, by way of the robot arm 5 (refer to FIG. 6). Then, according to the driving control of the pressing means 102 by the engagement control unit 100 (refer to FIG. 9), the first retaining portion 11 causes the pair of retaining means 101 to separate from each other to release the engagement with the valve guide Wa. The valve guide Wa engaged with the pair of retaining means 101 thereby drops down to be supplied to the supply pallet hole 70a.

Next, operations of the first retaining portion 11 to hold and carry the valve seats Wb arranged in the cutting pallet 6b to supply them to the supply pallet 7b will be explained while referring to FIG. 11.

Figure 11A:
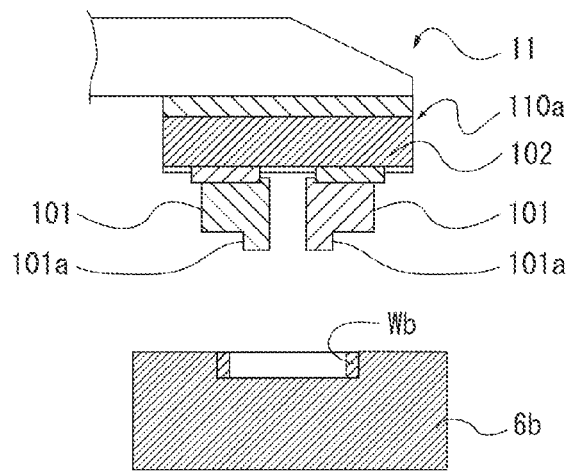
FIG. 11A is a view showing a state in which the first retaining portion is disposed above a valve seat arranged in the cutting pallet.
Figure 11B:
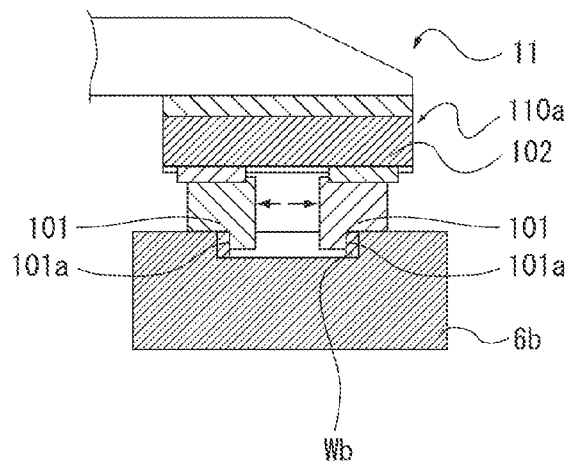
FIG. 11B is a view showing a state in which the first retaining portion holds the valve seat.
Figure 11C:
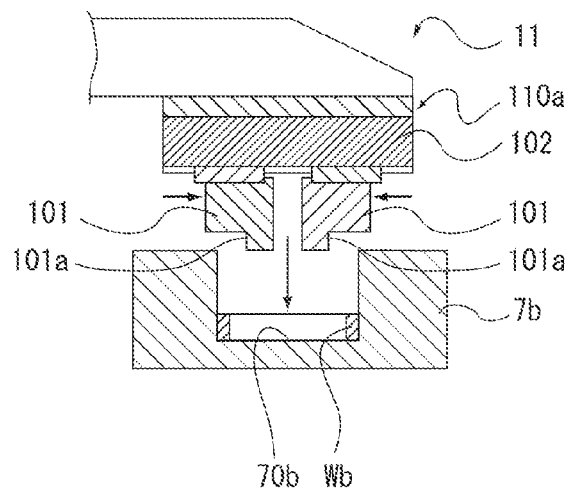
FIG. 11C is a view showing a state in which the first retaining portion has carried and supplied the valve seat to the supply pallet at a predetermined location.

FIG. 11A is a view showing a state in which the first retaining portion 11 is disposed above the valve seat Wb arranged in the cutting pallet 6b. FIG. 11B is a view showing a state in which the first retaining portion 11 holds the valve seat Wb. FIG. 11C is a view showing a state in which the first retaining portion 11 has carried and supplied the valve seat Wb to the supply pallet 7b at a predetermined location.

First, the first retaining portion 11 is disposed above the valve seat Wb arranged in the cutting pallet 6b, by way of the robot arm 5 (refer to FIG. 6), as shown in FIG. 11A. At this time, the pair of retaining means 101 of the first engaging part 110a of the first retaining portion 11 is disposed in a state in which the distance between the outer walls 101a is smaller than the inside diameter of the valve seat Wb.

Next, as shown in FIG. 11B, the first retaining portion 11 is brought close to the valve seat Wb disposed in the cutting pallet 6b by way of the robot arm 5 (refer to FIG. 6), and according to the driving control of the pressing means 102 by the engagement control portion 100 (refer to FIG. 9), causes the pair of retaining means 101 to separate from each other, whereby the inner circumference of the valve seat Wb is engaged with the outer walls 101a of the pair of retaining means 101 to hold the valve seat Wb.

Next, as shown in FIG. 11C, the first retaining portion 11 carries the valve seat Wb thus held to be above the supply pallet hole 70b formed in the supply pallet 7b to which the valve seat Wb is to be supplied, by way of the robot arm 5 (refer to FIG. 6). Then, according to the driving control of the pressing means 102 by the engagement control unit 100 (refer to FIG. 9), the first retaining portion 11 causes the pair of retaining means 101 to approach each other to release the engagement with the valve seat Wb. The valve seat Wb engaged with the pair of retaining means 101 thereby drops down to be supplied to the supply pallet hole 70b.

The following functional effects are exerted according to the present embodiment.

The first retaining portion 11, second retaining portion 12, third retaining portion 13 and fourth retaining portion 14 of the present embodiment hold and carry a plurality of works, and include the pair of retaining means 101 having the outer walls 101a of substantially semicircular shape and the inner walls 101b of substantially semicircular shape, and the pressing means 102 that causes this pair of retaining means 101 to approach each other or separate. These pairs of retaining means 101 hold the valve guides Wa with the inner walls 101b by being brought close to each other by way of the pressing means 102, or hold the valve seats Wb with the outer walls 101a by being separated from each other by way of the pressing means 102, and these pairs of retaining means 101 are connected in plurality along the arrangement direction of the plurality of valve guides Wa or valve seats Wb.

The first retaining portion 110, second retaining portion 12, third retaining portion 13 and fourth retaining portion 14 are thereby able to hold works with the outer walls 101a or inner walls 101b by either causing the pair of retaining means 101 to approach each other or separate by way of the pressing means 102. The first retaining portion 11, second retaining portion 12, third retaining portion 13 and fourth retaining portion 14 can hold the outer circumference of works with the inner walls 101b of the pairs of retaining means 101, or hold the inner circumference of works with the outer walls 101a of the pairs of retaining means 101, even for works having a central portion that is hollow.

In addition, since a plurality of the pairs of retaining means 101 and pressing means 102 are connected along the arrangement direction of the plurality of works, a plurality of works can be held and carried simultaneously. Furthermore, even if differently shaped works are arranged, for example, for such a work, the outer circumference of the work can be held by the inner walls 101b of the pair of retaining means 101, and for another work, the inner circumference of the work can be held by the outer walls 101a of the pair of retaining means 101; therefore, differently shaped works can be held and carried simultaneously.

Consequently, it is possible to provide a carrier hand that can reliably transfer even a work having a central portion that is hollow, as well as can simplify the equipment.

In addition, the first retaining portion 11, second retaining portion 12, third retaining portion 13 and fourth retaining portion 14 can hold and carry the outer circumference of the valve guides Wa with the inner walls 101b of the pairs of retaining means 101, and hold the inner circumference of the valve seats Wb with the outer walls 101a of the pairs of retaining means 101. In other words, the same carrier hand can be commonly used for transferring the valve seats and valve guides.

Consequently, it is possible to provide a carrier hand that can reliably carry even valve seats and valve guides having a central portion that is hollow, as well as can simplify the equipment.

It should be noted that the present invention is not to be limited to the above embodiments, and that modifications, improvements and the like within a scope that can achieve the object of the present invention are included in the present invention.

What is claimed is:

1. A carrier device that holds and transfers a plurality of works arranged at even intervals and at least two different lengths relative to a common horizontal plane defined by the carrier device, such that the plurality of works are supplied to a supply portion, the device comprising:
   a plurality of retaining portions disposed above the plurality of works that hold the plurality of works;
   a retaining base portion to which the plurality of retaining portions is connected; and
   a controller,
   wherein the retaining base portion includes a plurality of sliding portions that allow the plurality of retaining portions to approach each other or separate from each other in an arrangement direction of the works,
   wherein the plurality of retaining portions each includes at least two engaging parts that disengage with the works independently,
   wherein the at least two engaging parts are configured to be divided into at least two groups corresponding to the at least two different lengths, and
   wherein the controller causes the plurality of sliding portions and the at least two engaging parts to supply the plurality of works to the supply portion at predetermined different intervals for the at least two groups.

2. A transfer method for supplying a plurality of works arranged at even intervals and at least two different lengths relative to a common horizontal plane defined by a carrier device to a supply portion, the method comprising the steps of:
   holding each of the plurality of works by at least two engaging parts provided to each of a plurality of retaining portions disposed above the plurality of works;
   transferring the plurality of works to the supply portion;
   setting first works that are one type among the plurality of works arranged at the at least two different lengths and held in the at least two engaging parts, respectively, at a first predetermined interval, by driving a plurality of sliding portions to cause the plurality of retaining portions to approach each other or separate from each other in an arrangement direction of the plurality of works;
   supplying the first works to the supply portion;
   setting second works that are another type among the plurality of works arranged at the at least two different lengths and held in the at least two engaging parts, respectively, at a second predetermined interval, by driving the sliding portions to cause the plurality of retaining portions to approach each other or separate from each other; and
   supplying the second works to the supply portion.

* * * * *